3,148,046
METHOD OF COOLING CAST GLASS SHEET
Ivan Peychès, Stéphane Dufaure de Lajarte, and Bernard Laurent, Paris, France, assignors to Compagnie de Saint-Gobain, Paris, France
Filed Apr. 22, 1958, Ser. No. 730,107
4 Claims. (Cl. 65—95)

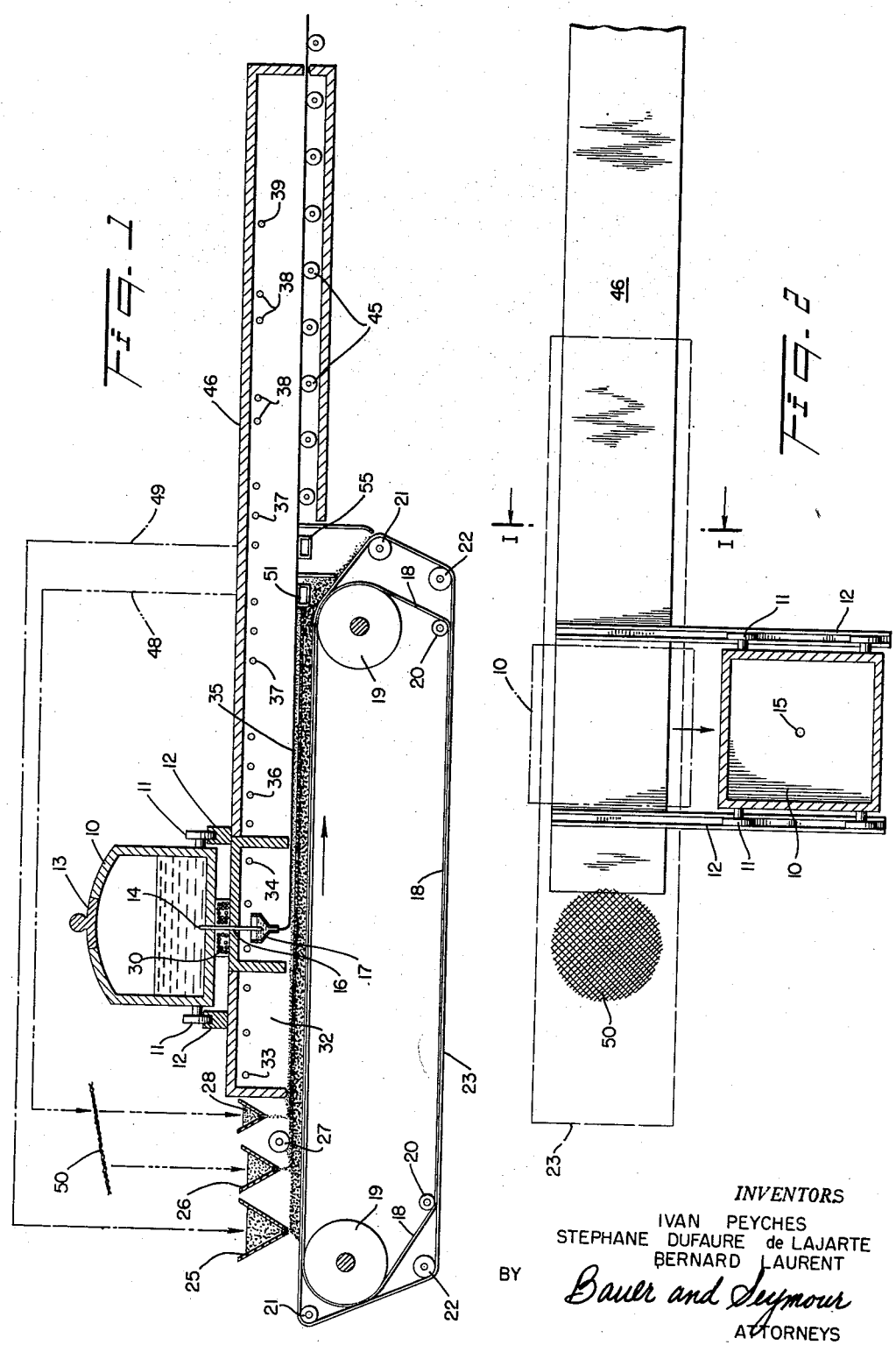

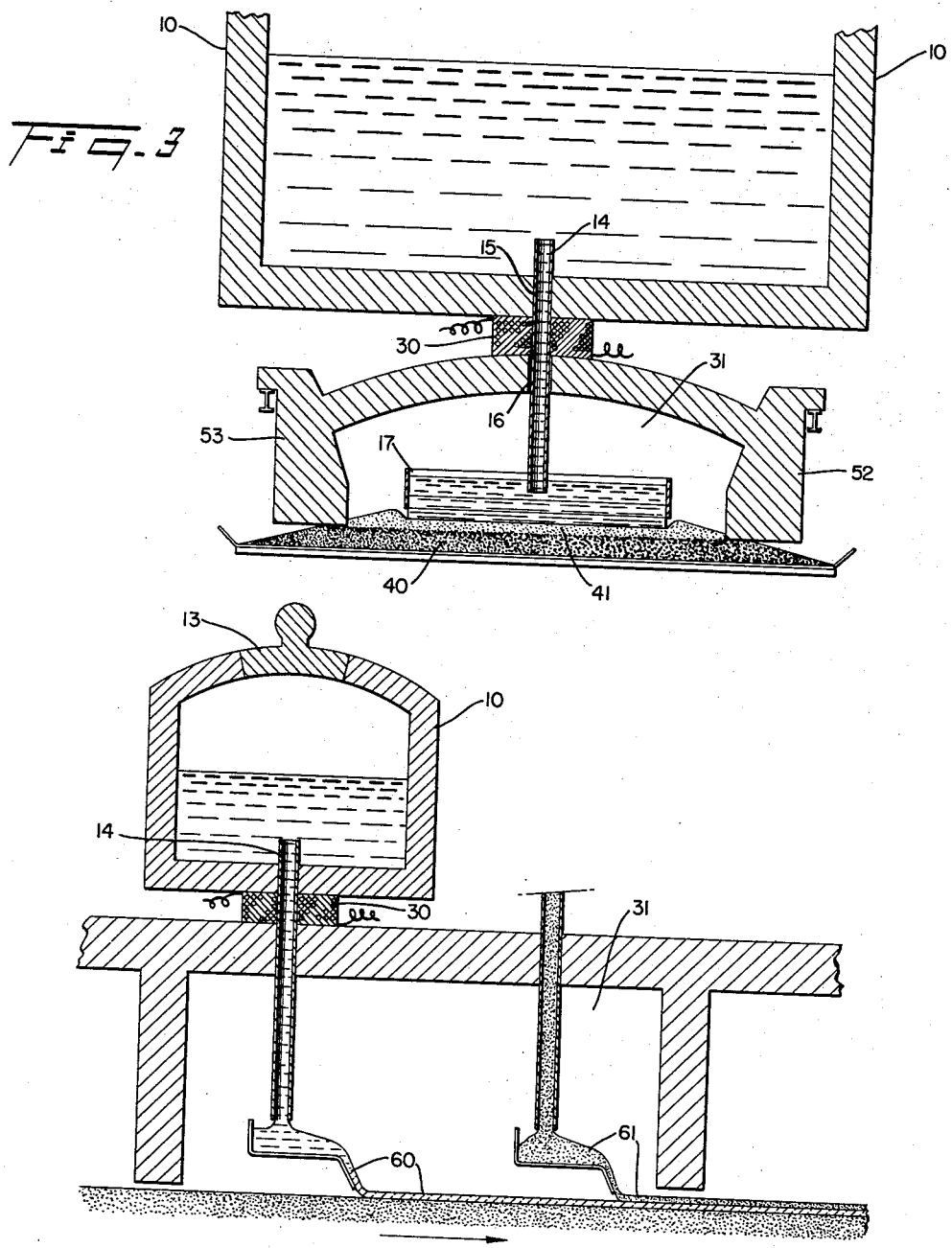

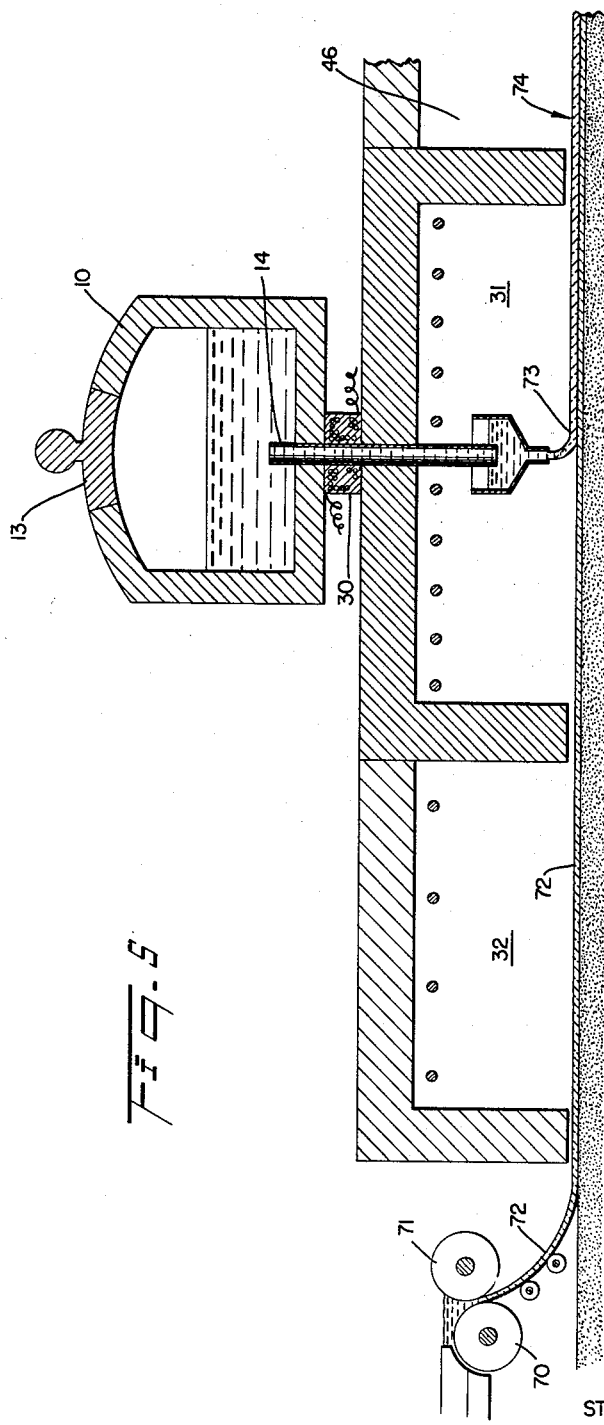

This case relates to the manufacture of flat glass and particularly to the continuous production of glass sheets by casting glass in one or more layers in a plastic state. As heretofore produced by casting and cooling, such sheets have surfaces not free of irregularities and not perfectly plane, so that they have to be ground and polished if their surfaces are to be plane, smooth, and of polished aspect.

Even when one succeeds in getting a sheet of glass that is apparently plane and of polished aspect in the natural state, there are still visible defects which arise from a juxtaposition of surfaces at different levels, usually of small amplitude and large radius of curvature. These defects have the inconvenience of deforming the images by reflection and transmission. In such case the product has an unsatisfactory appearance compared to glass, such as plate glass, which is produced by grinding and polishing.

Glass sheets have a natural surface when they have been produced without the aid of tools. Thus, window glass has a natural surface as it is lifted out of the forming machine and cooled, but, if the glass is ground, that natural surface is removed, and another surface is applied by polishing, producing a finish which is superior but not natural. Natural surfaces have been subject to various disadvantages and have generally been quite inferior to polished surfaces.

It is an object of this invention to prepare flat glass with a natural surface which is plane and of polished aspect. This is particularly important in glass of the type called opal glass which is opaque or colored, and used for coatings for walls, revetments, table tops, and so forth, and requires a plane and polished aspect because of its use. These glasses must be free from defects deforming the images seen by reflection, especially those resulting from juxtaposition of surfaces of the order of about one cm.$^2$ at different levels, of small amplitude of the order of a few hundredths of an mm. These defects give the impression that the sheet has been marked as a hammered metal.

Another object is to eliminate at least a substantial part of the operations of grinding and polishing which add materially to the cost of the product.

Another object is to increase the quality of natural flat glass.

We have discovered that the above mentioned defect, called hereafter hammering, occurs if a noticeable gradient of temperature exists between the two faces of the sheet of glass and on the length of the sheet during cooling within a particular zone of temperature which lies between about 800° and 600° C. for usual glasses which serve for the manufacture of opal glass, temperatures which correspond to a viscosity range of about $10^5$–$10^{10}$ poises. It is, therefore, an object of this invention to cool the glass within this range of temperature and viscosity in such a way that hammering does not occur.

The glass being relatively fluid in this range, the differences of viscosity in the glass, which result from differences in temperature between adjacent regions, make the contraction of the glass during cooling irregular and introduce a permanent deformation of the surface which we call "hammering."

The objects of the invention also include novel apparatus for carrying out the novel process.

The objects of the invention are accomplished, generally speaking, by cooling the sheet of glass from a viscosity of about $10^5$ poises to a viscosity of $10^{10}$ poises at such a rate that no marked difference in temperature exists in adjacent regions of the glass during the cooling in this range, particularly avoiding any marked differences in temperature between adjacent regions as the glass passes through the viscosity of $10^{10}$ poises. It is to be understood that the range of temperatures corresponding to the viscosities of $10^5$–$10^{10}$ poises may vary somewhat for different compositions of the glass, and that, to determine the optimum range of temperatures for a particular glass, one may be led to alter either the upper temperature of the range or the lower.

In the majority of cases, the temperature gradient between adjacent regions which is permissible as the glass enters the range corresponds to a ratio of viscosity, which should not be greater than $10^2$, the maximum viscosity being then for example $10^5$ poises on one face of the sheet of glass and the minimium viscosity being $10^3$ poises on the other face. This ratio of viscosity should be reduced progressively as the sheet is cooled until it is no more than a few units at the end of the range, the minimum viscosity then being, for example, $10^{10}$ poises on one face and the maximum viscosity being $10^{10.5}$ poises on the other face. The cooling should preferably be conducted so that the viscosity should not more than double itself per minute.

Thus, the invention leads to control the cooling of the sheet of glass with superior precision in a range corresponding to viscosities much lower than those corresponding to the region between the upper annealing point of $10^{13.4}$ poises and the strain point of $10^{14.6}$ poises, which was heretofore the range in which the cooling of the glass was carefully controlled in order to produce annealing.

In the practice of the invention, the glass sheet is cast on a horizontal mobile support which is thermally insulating and which is at about the same temperature as the sheet as it is deposited. The casting preferably occurs in an enclosure which is also at the same temperature. Thereafter the sheet is passed through zones of decreasing temperature from a temperature corresponding to the viscosity of $10^5$ poises until it reaches a viscosity of $10^{10}$ poises. During this phase of the cooling the glass rests on a heat-insulating support and is in a chamber of which the temperature is controlled so that the loss of calories by convection through the lower face of the glass can be kept approximately equivalent to the loss by radiation and convection from the upper face. There is thus avoided any excessive difference in temperature between the exterior and the interior of the sheet, provided that its rate of travel through the regions of decreasing temperature is sufficiently slow. This rate will be adjusted to compensate for sheets of different thickness.

For example, in order to produce a sheet 5–7 mm. thick from soda-lime glass containing a small proportion of boron, which is particularly useful for making revetments in building construction, the reduction of temperature from 800° to 600° C., which corresponds to the range of viscosity between $10^5$ and $10^{10}$ poises, should take 20 minutes. Under these conditions, the glass has an unhammered surface, is of uniform thickness, and is plane, and all of its original perfection will be preserved without hammering, including its plane surface. For soda lime glass sheets having a thickness of 3 to 7 mm., good results were obtained with rates of travel between 10 and 40 cm. per minute; in these cases the reduction of temperature from 800 to 600° C. was attained on a travel of a few meters for example 3 to 8 meters according to the rate of travel.

It is to be understood that the slow cooling in the range of this invention may be followed by annealing, according to customary practice, in the annealing range which begins at $10^{13.4}$ poises, or by other heat treatment such as tempering or by a brief intense heating as described in French Patent 1,036,011 of April 21, 1951.

It is already known how to cast a sheet of glass and any such casting means may be employed in this case. However, it is important that the sheet be of reasonably uniform temperature through its whole thickness as it enters the novel range at a viscosity of about $10^5$ poises.

In the initial casting, the glass should have an initial temperature high enough to have good fluidity and leveling power, so as to produce by itself, by subsidence, a plane surface and regular thickness on the support. The glass sheet thus produced has an upper face which is of polished aspect due to the fact that the face is actually formed out of contact with any instrument, even though it may have been discharged from the furnace through an instrument, the actual formation of the face occurring after contact with the pouring or casting instrument has been terminated. For all glasses, good leveling power is possessed by the glass at viscosities above $10^2$–$10^3$ poises. For soda lime glasses of the type which we have used in the specific example of the case the temperature corresponding to this viscosity is about 1100° C. This value of the temperature may differ somewhat for glasses of different concept, but is readily determinable by simple experiments.

According to one method of carrying out the invention, this leveling of the glass is attained by placing the casting appartus and the support, on which the glass is poured, in an enclosure which is at about the same temperature as the glass. By adjusting the temperature of this enclosure, the fluidity of the glass can be controlled so as to produce a sheet having the surface perfection which is sought.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is a diagrammatic elevational view partly in section of an apparatus according to the invention;

FIG. 2 is a diagrammatic plan view thereof;

FIG. 3 is a diagrammatic view partly in section, in different scale, on line I—I of FIG. 2;

FIG. 4 is a diagrammatic elevational view partly in vertical section of an apparatus for making laminated glass by the invention; and FIG. 5 is a diagrammatic view partly in vertical section of a modified apparatus for making laminated glass.

In the drawings, 10 represents a device for supplying molten glass to the apparatus of the invention. It is represented as a feeding compartment of a tank above the apparatus for casting the sheet. A cap 13 gives access to the interior of the reservoir 10 and permits a drainage tube 14 to be passed through an opening 15 in the reservoir and an opening 16 in the top of the chamber which encloses a slotted delivering trough 17, through the slot of which a sheet of glass is cast.

The glass is received from the top of a prepared surface which moves at the same rate at which the glass sheet is cast. The prepared surface is supported on an endless belt 18 which runs around rollers 19, 20 which keep it taut in any of the ways which are employed for that purpose. The belt itself may be made of steel and may be comparable to the type which is used in the annealing lehr for bottles. Another set of rollers 21, 22 supports an endless web of fabric, such as asbestos or the like, which is impermeable to granular materials and resistant heat. Between rollers 19 the belt 23 lies on the surface of the belt 18 and is provided to support a heat resistant granular material.

A trough 25 contains and is supplied with a heat-insulating material, such as sand, and delivers it in even thickness across that part of the belt and fabric which is to receive the sheet of glass. Another trough 26 contains a hotter heat-insulating material which it disposes upon that which was deposited by trough 25. A roller 27 levels the layers, so that the upper surface of the prepared bed is planar.

In the preferred form of the invention, a trough 28 delivers a fine powder to the top of the bed thus prepared, and it is this which receives the glass sheet cast by trough 17. The trough 17 is composed of refractory material or metal and has an elongated opening with parallel edges which are very close to the surface of the prepared bed so as to prevent the formation of undulations and the inclusion of bubbles in the cast sheet. The tube 14 may be of platinum and, as the lower end of the tube is inside the trough 17, the flow of glass from the trough is independent of the level of glass in the furnace 10. The tube 14 is provided with a heating element 30 (FIG. 3) of electrical-resistance type, or the tube 14 may be heated by the passage of an electrical current through it, in order to prevent cooling of the glass during its journey to the casting trough 17 and delivers it to the trough at any selected temperature. The casting trough 17 is placed in a chamber 31 which encloses that part of the mobile support 18 onto which the sheet of glass is fed. This enclosure is kept at a temperature near that of the glass which supplied trough 17. The surface of the support, the prepared bed, arrives in the enclosure 31 at about the same temperature as that of the glass, due to heat effectuated in a chamber 32 which is in advance of chamber 31 and is heated by resistors 33 or other appropriate heating means. The temperature in chamber 31 may be maintained by heating means such as resistors 34. The temperature of the glass as it is spread on the prepared bed is such that the glass is self-leveling.

The sheet of glass 35, having subsided to a plane surface and a polished aspect, issues from the isothermal chamber 31 on the prepared bed into a tunnel 26 which is insulated and locally heated to progressively decreasing temperatures by heating means such as resistor groups 36, 37, 38, 39. The electrical power fed to each group of resistors is controlled in order to obtain a gradual loss of temperature between 1000°–1100° C. which is the temperature of chamber 31 and 500° C. and to control accurately the cooling of the sheet between 800° and 600° for ordinary soda-lime glasses for obtaining between the upper and lower faces a ratio of viscosities not greater than $10^2$ in the vicinity of the upper temperature about 800° C., this ratio decreasing as the glass reaches the lower temperature. In case this cooling tunnel is insulated to produce a gradual loss of temperature, the heating means may not be used. Otherwise, the temperature can be controlled as indicated in the drawing. By this means the sheet is progressively set without setting up any temperature differentials in its thickness, and passes from the viscosity of $10^5$ to $10^{10}$ poises without hammering the plane and polished upper surface.

The prepared bed is of material importance in accurately controlling the fall in temperature within the range of the invention and is of novel constitution. It contains a bottom layer of refractory material 40 (FIG. 3), the grain size of which permits easy packing and leveling. The thickness of this layer may be on the order of 10 cm., which is enough to thermally insulate the endless belt on which it rests so that it does not exceed a relatively low temperature, such as 150° C., and prevents excessive expansion and contraction. The bed 40 may be glassmaker's sand having a grain size less than about 0.25 mm., and of which 80% has a grain size superior to about 0.15 mm. Above the layer 40 it is desirable to deposit a lower layer 41, several tens of millimeters thick, of a finer product to prevent adhesion of the lower face of the glass sheet with sand grains of the larger size, which would cause difficulties during annealing or during the cutting of the sheet.

The pulverized product used may be chamotte (grog) having a grain size not over 0.1 mm. This makes the surface practically impermeable to the glass. In addition, when attached to the lower face of the glass, it constitutes a very thin packing which is not harmful during annealing and cutting. Furthermore, when a glass sheet is used as a revetment, this scanty coating facilitates the placement of the glass on the wall. The endless belt 18 is covered with an endless sheet which is impermeable to the granular material and may be composed of various materials, of which glass fibers or asbestos are exemplary. The problem of maintaining the belt 18 in a level position has been solved in the paper-making industry and presents no problem here.

The glass is kept on the moving prepared bed until its temperature has been reduced enough to lower the viscosity of the sheet below $10^{10}$ poises, after which it is corners of the side walls 52, 53 of the tunnel 46 enter has enclosed the sheet since it passed out of the isothermal chamber 31. The sheet can be further treated in the tunnel, as explained above. It will be assumed, looking at FIG. 1, that the sheet had passed through the point of $10^{10}$ poises about as it reached the roller 19.

The prepared bed is separated, after it leaves the glass sheet, into a hot upper layer and a cooler lower layer, which are gathered by separators (not shown) and returned, as indicated by lines 48, 49, to a screen 50 and the trough 25 respectively. The screen 50 separates the very fine grains from coarser grains, the latter being directed to trough 26 and the former to trough 28 for reuse in reconstruction of the prepared bed. Any handling means that is well known can be used of this purpose. An initial separation of dust from the top of the prepared bed can take place by means of a vacuum-type dust catcher 51, and this dust may also be returned to trough 28. The roller 27 packs the layers deposited in troughs 25, 26 and provides a firm and level surface upon which the light material from trough 28 lies as a thin blanket. The prepared bed as thus reconstituted is heated again in chamber 32.

It will be observed in FIG. 3 that scraping devices (not shown) have given the border of the prepared bed a slope at an inclination of rest, and that the inner corners of the side walls 52, 53 of the tunel 46 enter these borders and form a thermal seal which retains the heat of the tunnel. A brush 54 acts to remove attached particles from the bottom of the glass sheet and another vacuum cleaner 55 removes any adhering particles by suction.

FIG. 4 represents an apparatus for making a sheet of laminated glass, and it specifically illustrates the lamination of different kinds of glass, a lower layer 60 of clear glass and an upper layer 61 of opal glass. These glasses should have approximately the same coefficient of expansion. The two layers are deposited, one above the other, on the moving prepared bed in the isothermal chamber 31 from a plurality of glass reservoirs 10, one of which is not shown, by means of casting devices of different type than that disclosed in FIG. 5. Both types are useful, that of FIG. 4 being of fall type, and that of FIG. 5 being of slot or nozzle type.

FIG. 5 shows another modification for manufacturing a laminated sheet, wherein the lower sheet 72 is rolled between rollers 70, 71 in the free air and deposited upon the prepared bed, before it enters the preheating chamber 32. The rolling apparatus could also be placed within chamber 32 or within chamber 31 in order to avoid cooling of the glass in open air. From that chamber 32 the glass sheet 72 is carried in to chamber 31, and, due to its passage through the preheating chamber 32, is substantially at the same temperature as the second sheet 73 deposited on it in chamber 31, in such a manner that the levelling and the solidifying of the second sheet are carried out under the conditions according to the present invention resulting into a sheet having an unhammered natural polished surface. This second layer can be of the same or of different glass than the first layer. These layers are at a temperature at which they are self-laminating, and they travel as a unit 74 into the cooling tunnel 46.

It will be perceived from the modifications and illustrations given that various arrangements of apparatus and process steps can be adopted to carry out the laminating process.

According to another modification of the process, one may deposit on the support a sheet of glass, of which the surface and viscosity are of any chosen viscosity, the glass even being in the solid state until slightly plastic and being carried into the isothermal chamber itself to the temperature necessary to permit it to flow by gravity.

Glasses will flow by gravity and will subside when the viscosity is between $10^4$ and $10^2$ poises, and in this range of viscosity will themselves develop a plane surface having a polished aspect, substantially free from hammering.

Among minor variants in the apparatus are the use of a plurality of tubes 14 to secure equal distribution of the glass in the casting trough, or to provide means for moving a single tube 14 from place to place across the width of the chamber 31 and the glass reservoir 10. In lamination, glasses of different types, types differing in color, composition, opacity or in any other way, can be successfully laminated with the production of a plane and unhammered face, provided only that they have similar degrees of expansion and contraction.

The process produces a glass having one plane surface of polished aspect substantially free of hammering.

Another advantage of the invention is in the discovery of this new and important range of viscosity between about $10^5$ and about $10^{10}$ poises and its efficacy in controlling the surface condition of the sheet.

A particular advantage of the invention is the production of a surface on flat glass by natural subsidence which is plane and substantially free of differences in level and other irregularities which produce visible imperfections in the surface.

Other advantages are the production of sheets having naturally a fire polished surface which is free of tool marks and a rugose face due to the contact with the powdered bed, this rugosity, when the sheet to be used as a wall-coating insuring greater facilities for its fixation to the wall.

As many apparently widely different embodiments of the present invention may be made without departing from the spirit and scope thereof, it is to be understood that the invention is not limited to the specific embodiments.

What is claimed is:

1. The method of making flat glass having a natural surface of fire polished aspect that comprises casting a sheet of flat glass at a temperature corresponding to a viscosity of about $10^3$ poises, supporting the cast sheet horizontally on a particulate surface comprising thermal insulation, and reducing the temperature of the sheet and controlling the cooling of said sheet from a temperature corresponding to a viscosity of about $10^5$ poises to a temperature corresponding to a viscosity of about $10^{10}$ poises at a rate which reduces the ratio of viscosity between the upper and lower faces of the sheet from not substantially more than $10^2$ at a temperature corresponding to about $10^5$ poises to a few units at a temperature corresponding to about $10^{10}$ poises, the rate of increasing the viscosity not exceeding substantially the double of its value per minute.

2. A method of making a glass sheet from soda-lime glass with a natural surface free of irregularities and having a fire polished aspect that comprises casting the sheet horizontally at a temperature of about 1100° C. at which it is self-leveling, and reducing its temperature to 800° C. and controlling the cooling through a temperature range of 800° C.–600° C. corresponding to viscosities of $10^5$ to $10^{10}$ poises for soda-lime glass, at a rate which eliminates marked differences in temperature between the upper and lower faces of the sheet during its passage through that range and until all parts of the sheet have reached the maximum value of viscosity of $10^{10}$ poises.

3. The method of casting and cooling flat glass which comprises preparing a bed of particulate thermal insulation with a flat surface, pouring molten glass onto the bed at a viscosity which allows the glass to level itself, and reducing the temperature to that corresponding to a viscosity of about $10^5$ poises at a rate producing no ratio of viscosity between the upper and lower faces of the sheet greater than about $10^2$.

4. The method of making glass with a plane, natural surface having fire polished aspect that comprises bringing a sheet of glass at a temperature at which it is self-leveling and cooling the sheet through a range of viscosities between $10^5$ and $10^{10}$ poises at a rate which eliminates marked differences in temperature between adjacent parts of the surfaces of the sheet as well as of the thickness of the sheet during its passage through that range and until all parts of the sheet have reached the maximum value of vicosity of $10^{10}$ poises.

References Cited in the file of this patent

UNITED STATES PATENTS

| | | |
|---|---|---|
| 1,133,751 | Shields | Mar. 30, 1915 |
| 1,156,251 | Shuman | Oct. 12, 1915 |
| 1,157,953 | Mygatt | Oct. 26, 1915 |
| 1,168,303 | Hazel | Jan. 18, 1916 |
| 1,469,382 | Crowley | Oct. 2, 1923 |
| 1,554,886 | Slingluff | Sept. 22, 1925 |
| 1,595,912 | Monro | Aug. 10, 1926 |
| 1,884,926 | Van Ness | Oct. 25, 1932 |
| 2,215,227 | Nash | Sept. 17, 1940 |
| 2,303,885 | Miller et al. | Dec. 1, 1942 |
| 2,682,730 | Rossen | July 6, 1954 |

OTHER REFERENCES

Tooley's Handbook of Glass Manufacture, 1953, Ogden Publ. Co., pp. 391–408.

Glass, the Miracle Worker, by Phillips, published by Pitman Publishing Co., N.Y., 1941, pp. 99 and 100. (Available in Division 91.)